United States Patent
Makoto et al.

(10) Patent No.: US 6,701,009 B1
(45) Date of Patent: Mar. 2, 2004

(54) METHOD OF SEPARATED COLOR FOREGROUND AND BACKGROUND PIXEL IMPROVEMENT

(75) Inventors: Otsu Makoto, Vancouver, WA (US); William Ho Chang, Vancouver, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 625 days.

(21) Appl. No.: 09/588,848

(22) Filed: Jun. 6, 2000

(51) Int. Cl.[7] .............................. G06K 9/34; G06K 9/56; G06K 9/48; H04N 1/60
(52) U.S. Cl. .................. 382/164; 382/165; 382/167; 382/180; 382/199; 382/205; 382/224; 358/1.9; 358/448; 358/518
(58) Field of Search ................................ 382/167, 162, 382/164, 165, 173, 176, 180, 199, 200, 205, 224, 266, 269; 358/1.1, 1.9, 2.1, 3.01, 3.27, 448, 462, 464, 518, 521, 530, 531, 532, 534, 535

(56) References Cited

U.S. PATENT DOCUMENTS

| | | | |
|---|---|---|---|
| 4,583,116 A | | 4/1986 | Hennig et al. |
| 5,500,746 A | | 3/1996 | Aida |
| 5,583,659 A | * | 12/1996 | Lee et al. .................. 358/3.13 |
| 5,737,003 A | | 4/1998 | Moe et al. |
| 5,760,815 A | | 6/1998 | Genovese |
| 5,774,156 A | | 6/1998 | Guerin |
| 5,825,938 A | * | 10/1998 | De Lange .................... 382/263 |
| 5,852,673 A | * | 12/1998 | Young ......................... 382/164 |
| 5,907,414 A | | 5/1999 | Hiratsuka |
| 5,986,771 A | * | 11/1999 | Henderson et al. ......... 358/448 |
| 6,128,046 A | * | 10/2000 | Totsuka et al. ............. 348/590 |
| 6,337,925 B1 | * | 1/2002 | Cohen et al. ................ 382/199 |
| 6,429,875 B1 | * | 8/2002 | Pettigrew et al. ........... 345/591 |
| 6,453,069 B1 | * | 9/2002 | Matsugu et al. ............ 382/173 |
| 6,556,313 B1 | * | 4/2003 | Chang et al. ................ 358/1.9 |
| 6,571,012 B1 | * | 5/2003 | Pettigrew .................... 382/167 |

OTHER PUBLICATIONS

Machine Translation of JP 08191392 A, Jul. 23, 1996.*

* cited by examiner

Primary Examiner—Jayanti K. Patel
Assistant Examiner—Christopher Sukhaphadhana
(74) Attorney, Agent, or Firm—Marger Johnson & McCollom, P.C.

(57) ABSTRACT

A method for separating foreground and background image pixels from other pixels. The method determines if a current pixel is an edge pixel, and then selects a window of pixels surrounding the current pixel if it is on an edge. This window is then analyzed to produce a classification of a gradient field within the window, and defines foreground and background image pixel values depending upon the classification. Once foreground and background pixel positions are defined, the process interpolates the value for the current pixel. The accurate designation of foreground and background pixels eliminates or mitigates any color misregistration error in the pixel value.

8 Claims, 3 Drawing Sheets

METHOD OF SEPARATED COLOR FOREGROUND AND BACKGROUND PIXEL IMPROVEMENT

BACKGROUND

1. Field of the Disclosure

This disclosure relates to methods of image capture, more particularly for methods of accurately separating foreground pixels and background pixels from other pixels for color misregistration correction.

2. Background

Color image capture devices typically operate by capturing primary color component signals such as red, green and blue (RGB) from a set of charge coupled devices (CCDs). The CCDs are normally arranged in the sub-scan direction. The main scan direction, the direction in which the scanning bar moves, will be referred to as the X direction and the sub-scan direction, perpendicular to the main scan direction, will be referred to as Y.

These CCDs capture the image in one pass or in three passes, one for each primary color component. Regardless of the number of passes, however, there is typically some misalignment in the RGB signals. This misalignment between colors is referred to as color misregistration. It is caused by faulty superposition of the three colors. It normally manifests itself as color fringes on the edges of the objects that were scanned, text, graphics or drawings.

Color fringes normally appear as either cyan or magenta fringes on the edges of the scanned objects. Cyan fringes result from misregistration of the red signal, and magenta fringes result from misregistration of the green signal. The human eye does not normally detect misregistration of the blue signal, because of its low bandwidth and low contrast sensitivity.

Most often, color misregistration occurs in the Y direction. Vibration, scanning motion and the mechanical or optical design of the scanner can lead to faulty superposition of the three-color components. Several different approaches have been taken to solve this problem.

For example, some efforts have been directed at correcting the mechanical problems in the scanner by tracking registration marks. One example of these types of techniques is found in U.S. Pat. No. 5,737,003, issued on Apr. 7, 1998. In this patent, a laser scanner used to form latent images on the photoconductive belt is used to detect the position of the edge of the belt. The belt is then controlled to reduce the deviation of the belt from its path. It also includes a method for controlling the laser, and therefore the formation of the image, based upon the position of the belt.

Another of these mechanical registration techniques is found in U.S. Pat. No. 5,774,156, issued Jun. 30, 1998. The system uses several stations, one for each color of toner. The latent image formed by the individual scanners at the stations includes a registration area. The registration area is then aligned prior to the application of the toner. The registration area is then recharged to avoid having the registration marks attract any toner. This is repeated at each station to ensure proper positioning of the image before the latent image for the next color is formed.

U.S. Pat. No. 5,760,815, issued Jun. 2, 1998, shows another method. In this patent, a fiber optic detection means is used to detect registration signals produced by a retroreflector. The light from the retroreflector is analyzed and used to adjust the registration of the belt.

Other methods have focused on optical means to correct the misregistration. An example of these types of techniques can be found in U.S. Pat. No. 4,583,116, issued Apr. 15, 1986. In this patent, the color signals are manipulated to convert them into color separation signals for cyan, magenta, yellow and black. The edges of each of the colors is then detected and manipulated to switch lighter areas with darker areas, or vice versa, to avoid streaks and other imperfections.

In order to process the edges properly in these techniques, a determination must be made between pixels that belong in the foreground and those that belong in the background. Several techniques are used to detect color misregistration problems including foreground/background separation at the data level. Examples of these are found in U.S. Pat. Nos. 5,500,746 and 5,907,414. In U.S. Pat. No. 5,500,746, issued Mar. 19, 1996, the signals are manipulated to ensure that the dots formed are in line both in the X and Y directions for each color. The dots are resampled and repositioned as determined by line correction devices.

In U.S. Pat. No. 5,907,414, issued May 25, 1999, one of the more powerful prior art methods is shown. An image sensor used to scanning a manuscript generates signals and these signals are examined. If the examination of the signals determines that the pixel exists at an edge of a letter image, it is identified as such. These identified pixels are then adjusted in their brightness to ensure a smooth edge that was disrupted by vibration of the image sensor.

However, most of these techniques are too expensive or are too inaccurate to meet current expectations for quality. The digital color imaging market has become very competitive. Peripheral image capture and printing devices such as copiers, scanners, digital cameras, fax machines and printers continue to fall in price. Expectations of their quality continue to rise. Therefore, a method is needed that improves pixel separation into foreground and background at low cost but with high accuracy.

SUMMARY

One aspect of the invention is a method for separating foreground and background image pixels from other pixels. The method determines if a current pixel is an edge pixel, and then selects a window of pixels surrounding the current pixel if it is on an edge. This window is then analyzed to produce a classification of a gradient field within the window, and defines foreground and background image pixel values depending upon the classification. Once foreground and background pixel positions are defined, the process interpolates the value for the current pixel. The accurate designation of foreground and background pixels eliminates or mitigates any color misregistration error in the pixel value.

BRIEF DESCRIPTION OF THE DRAWINGS

For a more complete understanding of the present invention and for further advantages thereof, reference is now made to the following Detailed Description taken in conjunction with the accompanying Drawings in which.

DETAILED DESCRIPTION OF THE EMBODIMENTS

Figure 1:
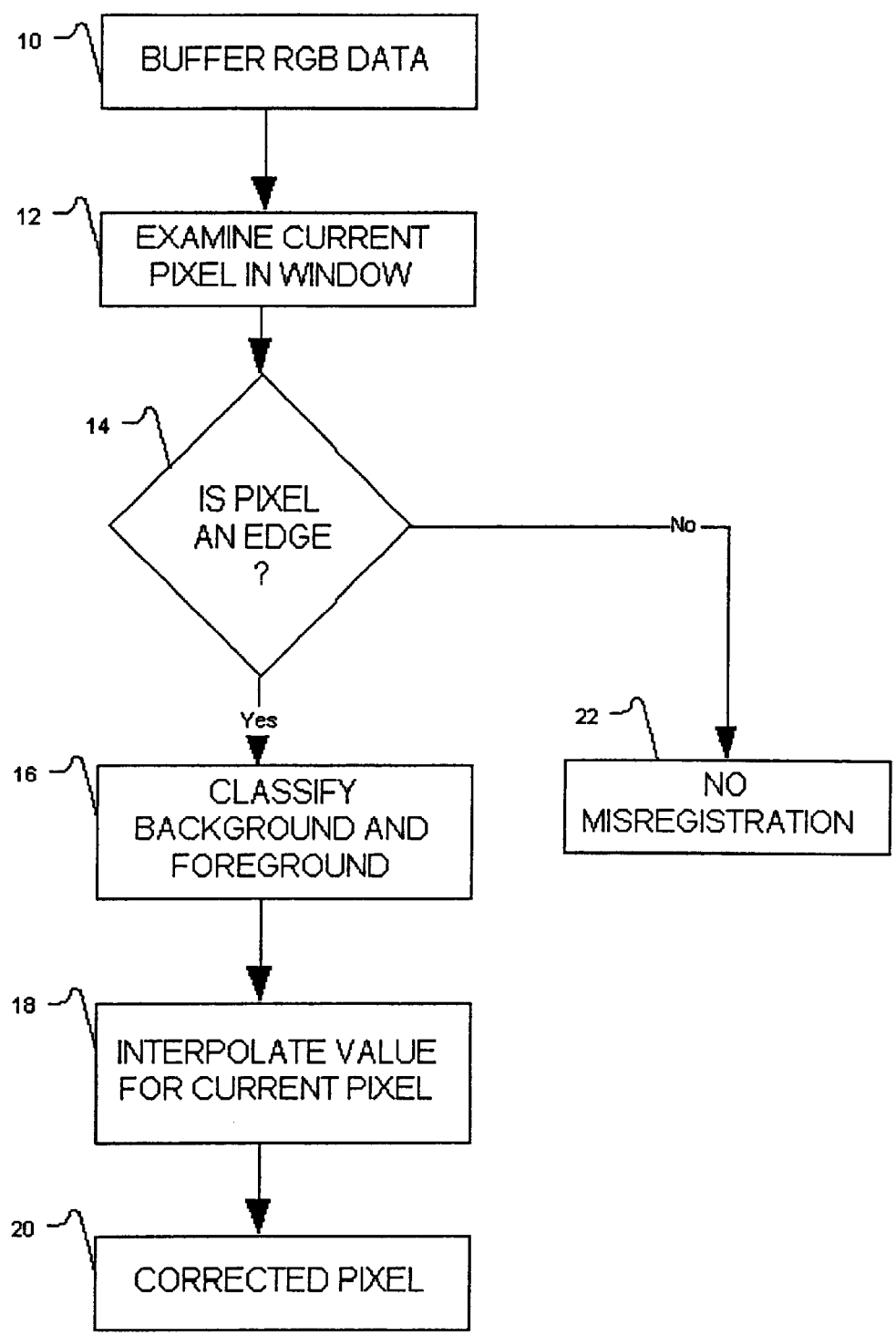
FIG. 1 shows a flowchart of one embodiment of a method for correction of color misregistration in accordance with the invention.

FIG. 1 shows one embodiment of a method for correcting pixels with color misregistration errors. At 10 the image data is buffered for further processing. In this embodiment, red-green-blue (RGB) data is assumed. As will be mentioned later, other color spaces could be used.

The image is processed for color misregistration detection on a pixel-by-pixel basis, with the pixel undergoing processing being referred to as the current pixel. In order to classify and gather information about the current pixel, it is examined within a window of pixels at 12. The window could be of any dimension, limited only by the desired accuracy and the system capabilities. For this example, a window of 5 pixels by 1 pixel will be assumed. The arrangement of the window is such that the current pixel is at the center of the line of pixels, at position 0 of the string:

−2 −1 0 1 2.

Analysis of the current pixel may be done using vector gradients. For any two color pixels A and B in the RGB color space, two color vectors can be defined as:

$P_A=(R_a,G_a,B_a)$ and $P_B=(R_a,G_a,B_a)$.

The gradient between pixel A and pixel B would then be:

$d_{ab}=(dR_{AB},dG_{AB},dB_{AB})$, and the magnitude would be $D_{AB}=$magnitude$(d_{ab})$.

These gradients are examples of those used in separating foreground and background pixels with misregistration. Misregistration is visually disturbing around high gradient edge areas, such as those between text and graphic images. At 14 of FIG. 1 an initial determination is made to eliminate those pixels not on edges. One could use any edge detector, such a Sobel or differential filter.

It is possible to use a gradient edge detector. One possible advantage of this type of detector lies in its ability to avoid thin and narrow characters such as those found in Kanji. In these types of characters, there is not enough information in the image to detect color misregistration.

Using the window defined in 12, the pixels are examined to determine if the gradient between the current pixel and its neighbors exceed a predetermined threshold. If they do not exceed the threshold, the pixels are not on an edge and are therefore not candidates for misregistration. This is shown in FIG. 1 at 22. One advantage of this approach is that it limits the number of pixels to which the rest of the process is applied. This saves time and processing resources.

Once the pixel is determined to be on an edge, the surrounding pixels must be classified as foreground or background at 16. This classification is important in proper correction of misregistration. Some techniques define a window and examine the window for darkest or lightest pixels or compare against a predetermined pattern. This is not accurate because both foreground and background could contain some color misregistration errors. This makes the selection inaccurate.

In an embodiment of the invention, the foreground and background pixel positions are used to interpolate the value of the current pixel at 18. Therefore, this selection must have the highest possible accuracy. Once the new value is determined, that value becomes the corrected pixel value at 20.

Having seen the overall process in which color misregistration is corrected for in the current pixel value, the discussion now turns to the classification of foreground and background pixels. As mentioned above, these values are used to interpolate the current pixel value and are set in such a way that any effects of color misregistration are mitigated in the corrected pixel value. In essence, the interpolation results in a truer pixel value to the pixel value in the original scanned image.

Similar to the gradient analysis used for edge detection, the gradient field of the window may be classified into one of a number of classes for faster processing. For example the gradient for a pixel at position 0 would be defined as $d_0=P1-P0$, or $(d_{R0},d_{G0},d_{B0})$.

Some examples of these classes are show in FIGS. 2a–2e. Each figure shows different possibilities for the red vector R, but is also intended to include the same problems for the green vector G or the blue vector B. The dashed line is merely intended as a reference point.

Figure 2A:
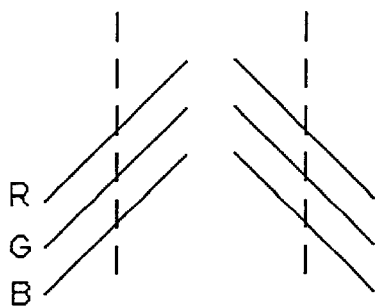
FIGS. 2a–e show graphical representations of gradient patterns found in images with color misregistration.
Figure 2B:
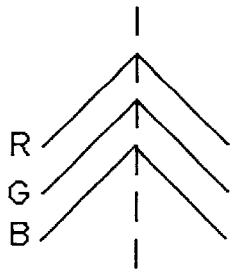
Figure 2C:
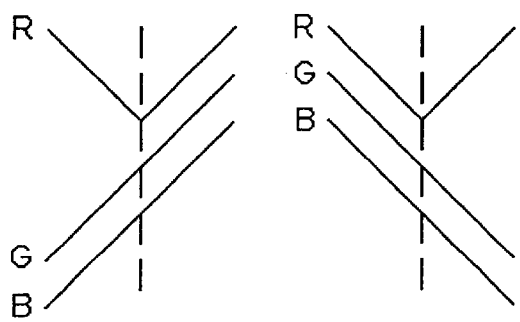
Figure 2D:
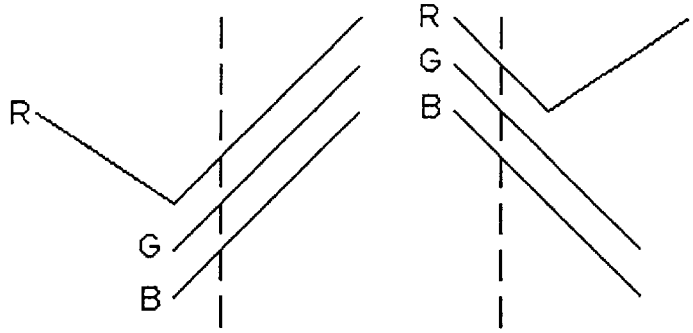
Figure 2E:
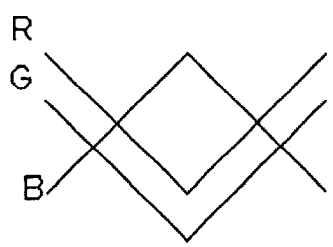

As can be seen by FIG. 2a, all three vectors are monotonically increasing or decreasing. This will be referred to in the example of the classification process as Case A. In FIG. 2b, all three color vectors have a similar vertex to the other vectors. This similar vertex case will be referred to as Case B. FIG. 2c shows an example of the red vector R having a vertex, while the green and blue vectors do not. This case of one vertex will be referred to as Case C. Case D, one shifted vertex, is shown in FIG. 2d. A shifted vertex means that one of the color vectors has a vertex, but it is not in line with the current pixel. Finally, the last example shows an inverted vertex in FIG. 2e, Case E.

Figure 3:
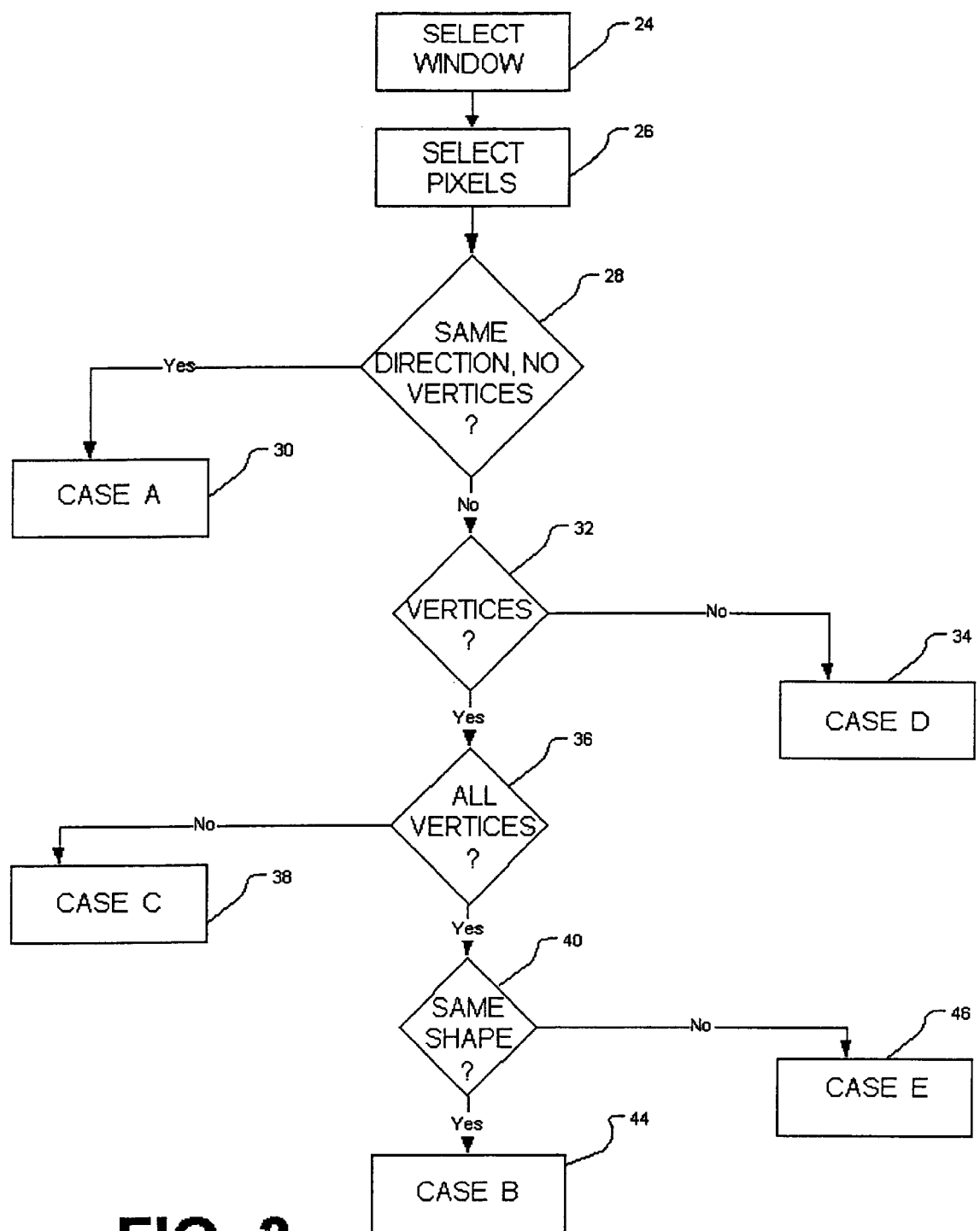
FIG. 3 shows a flow chart of one embodiment of a method for classifying of gradients found in images with color misregistration.

One embodiment of a method in accordance with the invention for using the gradient analysis to classify the current pixel into one of these cases is shown in FIG. 3. At 24 the window upon which the processing will be performed in selected. This may have the same dimensions of the window used in the overall correction process of FIG. 1. At 26 the pixels to be used for determining the gradients are selected. The selected pixels may have the maximum difference from the current pixel in either direction. This step includes calculating the gradient field for use in analysis.

The first classification in this example occurs at 28. If the directions of all the gradients are the same, the pixel is classified as Case A at 30. If the gradient directions are not all the same, the next decision point comes at 32. The process already knows that all the gradients are not the same, so if none of them are on vertices, then one must have a shifted vertex. The shifted vertex is what is indicated by the gradients not all having the same direction and the pixel is classified as Case D at 34.

At 36 it is known that at least one gradient has a vertex, so the others are checked to see if they are all on vertices as well. If this is not true, the classification must be one vertex, Case C at 38. If they are all on vertices, and all are the same shape as determined by 40, the classification is Case B at 44. If they are all on vertices but not the same shape, the classification is an inverted vertex at Case E at 46.

Once the case classification is completed, pixels in predetermined positions are selected as foreground and background pixels. The interpolation may be done in such a manner that it is not necessary to specifically identify which pixel values at the positions are foreground or background.

Following the example of the five cases, the foreground and background pixels may be selected according to the following table. These values are intended only as an example and therefore correspond to the red vector R having any variation from the other vectors. If the other vectors were the varying vectors, the application of these values would be adjusted accordingly. Similarly, these values assume a 5×1 window. If the window dimensions were different, the selection of the pixel positions would differ in proportion. The two pixel positions are given with relation to the variations as shown in FIGS. 2a–2e. The determination of 'left' and 'right' would also adjust to other applications of this example.

| CASE | | Left | Right |
|---|---|---|---|
| A | R | −2 | +2 |
|   | G | −2 | +2 |
|   | B | −2 | +2 |
| B | R | −2 | 0 |
|   | G | −2 | 0 |
|   | B | −2 | 0 |
| C | R | 0 | +2 |
|   | G | −2 | +2 |
|   | B | −2 | +2 |
| D | R | −2 | −1 |
|   | G | −2 | +2 |
|   | B | −2 | +2 |
| E | Don't care | Don't care | Don't care |

Case E is a special case, for which no further processing is performed.

These values are designated as foreground and background pixels relative to the current pixel. The value for the current pixel is then interpolated, using these values. The interpolation process does not care which pixel is designated as foreground or background. The resulting pixel value for the current pixel eliminates or mitigates the misregistration error, because the designation of foreground and background pixels is more accurate than other approaches discussed above.

Preferably, the above process is implemented in software in the image capture device. In this case, the invention would be embodied in some form of computer-readable medium such as code on a diskette, CD-ROM or downloadable file. The software code would perform the functions of the invention as described above.

It is possible that it could be implemented in the image output device that receives the image data from the image capture device. It could also be implemented in either part of a device that performs both image capture and image output. This process could be implemented in image or graphic application software, Raster Image Processors (RIP), or printer, copier or output device drivers, among others.

Alternately, the process could be implemented in application specific integrated circuits (ASIC), field programmable gate arrays (FPGA) or in digital signal processors (DSP). However, these hardware implementations are not as flexible, so the software embodiments are preferred.

As mentioned previously, this process could be applied to color spaces other than RGB. It could be implemented in CMY, CMYK and chrominance and luminance based color spaces, such as LAB, LCH, HLS, etc. None of the above specifics or examples are intended to limit applicability of the invention.

Thus, although there has been described to this point a particular embodiment for a method and apparatus for color misregistration detection, it is not intended that such specific references be considered as limitations upon the scope of this invention except in-so-far as set forth in the following claims.

What is claimed is:

1. A method for separating foreground and background image pixels, the method comprising:

determining if a current pixel is an edge pixel by comparing a gradient between the current pixel and at least one neighbor pixel to a threshold;

if the pixel is an edge pixel, selecting a window of pixels surrounding the current pixel;

analyzing the window to produce a classification from a classification set of a gradient field within the window, wherein the classification set comprises monotonic, similar vertex, one vertex, shifted vertex, and inverted vertex;

defining foreground and background image pixel positions depending upon the classification; and interpolating a value of the current pixel from the foreground and background image pixel positions, wherein the value of the current pixel is corrected for color misregistration.

2. The method of claim 1 wherein the window is 5 pixels by 1 pixel.

3. The method of claim 1, wherein the method is performed by micro-codes in a digital signal processor.

4. The method of claim 1, wherein the gradient field is in RGB color space.

5. The method of claim 1, wherein the gradient field is in CMY color space.

6. A computer-readable medium containing a program operable to separate foreground and background image pixels, the program comprising:

code operable to detect edges in the image pixels, wherein the code compares a gradient between a current pixel and at least one neighbor pixel to a threshold;

code operable to perform gradient analysis on a selected window of pixels surrounding a current pixel, if the current pixel is an edge pixel;

code operable to classify from a classification set the gradient for the selected window of pixels, wherein the classification set comprises monotonic, similar vertex, shifted vertex, and inverted vertex;

code operable to define foreground and background pixel positions relative to the current pixel depending upon the classification of the gradient; and code operable to interpolate a value of the current pixel from the foreground and background pixel position such that the value of the current pixel is corrected for color misregistration.

7. The computer-readable medium of claim 6, wherein the program is incorporated into image application software.

8. The computer-readable medium of claim 6, wherein the program is incorporated into a device driver.

* * * * *